United States Patent [19]
Kjensmo

[11] 3,744,689
[45] July 10, 1973

[54] CARRIERS, UTILIZING WHEEL SUPPORTS, HOLD DOWNS AND LOADERS FOR TWO WHEEL VEHICLES CARRIED ON CARS, TRUCKS, AND OTHER VEHICLES

[76] Inventor: Rodger J. Kjensmo, P.O. Box 115, Lynnwood, Wash.

[22] Filed: Apr. 29, 1971

[21] Appl. No.: 138,437

[52] U.S. Cl. .................................... 224/42.03 B
[51] Int. Cl. ............................................ B60m 9/10
[58] Field of Search ............. 224/42.03 B, 42.03 A, 224/42.03 R, 29 R, 42.06, 42.08, 42.12, 42.13; 214/450; 211/19, 23, 24, 20, 21, 22

[56] References Cited
UNITED STATES PATENTS

| | | | |
|---|---|---|---|
| 3,275,206 | 9/1966 | Croft | 224/42.03 B |
| 3,229,874 | 1/1966 | Schneider et al. | 224/42.03 B |
| 648,234 | 4/1900 | Brown | 211/19 |
| 2,417,952 | 3/1947 | Selzer et al. | 224/42.23 X |
| 3,355,028 | 11/1967 | Mork | 211/21 |

FOREIGN PATENTS OR APPLICATIONS

| | | | |
|---|---|---|---|
| 63,784 | 7/1949 | Netherlands | 224/42.03 B |

Primary Examiner—Gerald M. Forlenza
Assistant Examiner—Jerold M. Forsberg
Attorney—Roy E. Mattern, Jr.

[57] ABSTRACT

For carrying two wheeled vehicles, wheel supports, in pairs, with and without cross tracks and ramps, are attached to front or rear bumpers of cars, station wagons, pick-up trucks or other vehicles having suitable appendages. Each wheel support carrier properly spaced, mounted and adjusted will support the weight of an entire two wheeled vehicle. After tie downs are secured to holding posts of the wheel supports or otherwise secured, the two wheel vehicle so secured is ready for safe transport during travel on arterials and backwoods trails.

2 Claims, 12 Drawing Figures

INVENTOR.
RODGER J. KJENSMO
BY
Roy Mattern Jr.
ATTORNEY

INVENTOR.
RODGER J. KJENSMO
BY Roy Mattern Jr.
ATTORNEY

INVENTOR.
RODGER J. KJENSMO
BY Roy Mattern Jr.
ATTORNEY

INVENTOR.
RODGER J. KJENSMO
BY Roy Mattern Jr.

ATTORNEY

CARRIERS, UTILIZING WHEEL SUPPORTS, HOLD DOWNS AND LOADERS FOR TWO WHEEL VEHICLES CARRIED ON CARS, TRUCKS, AND OTHER VEHICLES

BACKGROUND OF INVENTION

While vehicle bumper mounted wheel supports, to carry all forms of two wheeled vehicles, have been available previously, all have been custom tailored to fit a certain wheel size or unadjustably made oversize to receive many varied wheel sizes. None are known to be adjustable for wheel size or readily adaptable to various bumper sizes and designs, to be easily collapsible into compact units for storage, or to be adaptable to accept cross tracks, loading ramps and upright supports for tie downs, and at all times protect both the vehicles from any damage.

SUMMARY OF THE INVENTION

Persons desiring to transport two wheeled vehicles, such as a motorcycle, on a car, truck or other four wheeled vehicle may mount it by using two individual wheel support carriers, respective upright supports connectedto each wheel support, and tie downs secured between the two wheel vehicle and the upright supports. Each wheel support is attached preferably to a four wheeled vehicle bumper by using an adjustable length overlapping hook, fitted over the top lip of the bumper parallel to the base of the wheel support and using adjustable fasteners inclusive of a padded adjusting bolt. Subsequently after a trip, when the wheel supports of the overall carrier are ready to be removed and stored away, often in the trunk of the four wheeled vehicle, the metal bands forming the loop or elliptical receiver for the tire and wheel, may be swung together into a compact planer arrangement with the bumper attachment structure. Initially each wheel support is readily mounted or detached to a vehicle bumper by adjusting only two fastening assemblies, and thereafter only one fastener assembly need be adjusted.

When desired, and especially for handling the heavier two wheeled vehicles, ramp loading and unloading is recommended. Each wheel support is easily modified to this configuration by adding a cross track supported on the wheel height adjusting device with the ramp secured to thek ross track during travel. At the destination the ramp is removed, a loop wheel support is rotated downwardly to be clear, the ramp is removed from under the cross track and attached to the cleared end of the cross track and rested on the ground, and then the two wheeled vehicle is wheeled off. Before getting underway at any time, upright supports or posts secured to each individual wheel support receive tie downs firmly wrapped previously around or secured by hooks to parts of the two wheeled vehicle to thereafter hold the two wheeled vehicle securely while the four wheel vehicle is underway.

DRAWINGS OF PREFERRED EMBODIMENT

A preferred embodiment of the invention is illustrated in the accompanying drawings, wherein.

DESCRIPTION OF THE PREFERRED EMBODIMENT

Figure 1:
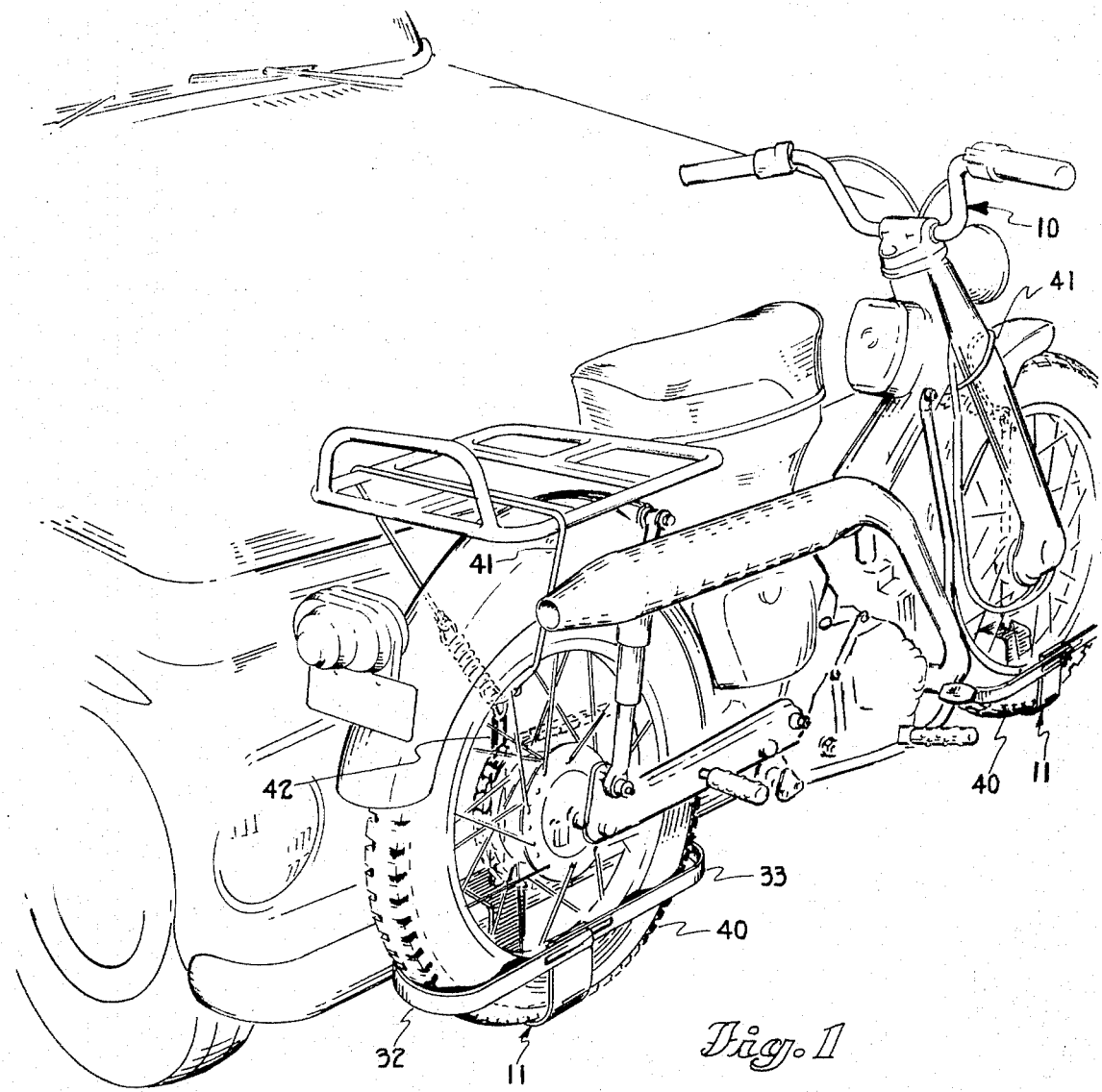
FIG. 1, shows in partial perspective, a two wheeled vehicle supported by individual wheel supports, each having upright supports to receive tie downs, and each being attached to the front bumper of a four wheeled vehicle.
Figure 2:
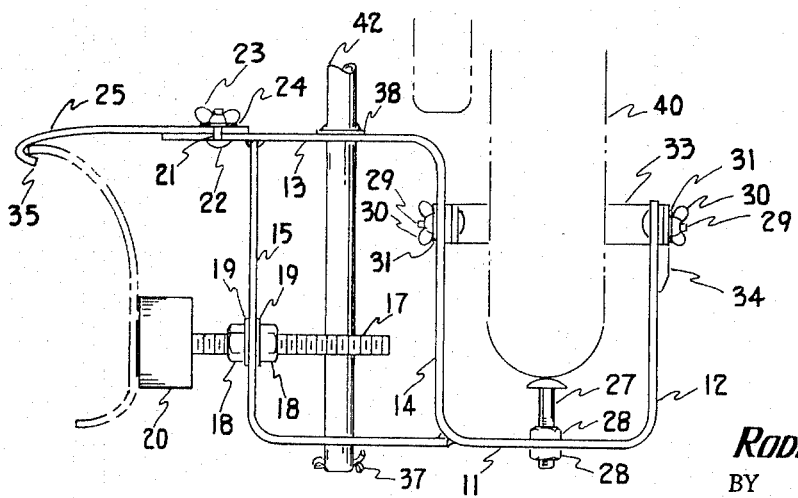
FIG. 2 is a partial cross section indicating how the individual wheel support with its upright support or post is mounted to a bumper of a four wheeled vehicle.

Support of lightweight two wheeled vehicles using individual wheel supports:

INDIVIDUAL WHEEL SUPPORT

Each wheel support 11 is fabricated from flat metallic plate into a basic structure 12 of U-shape, with an arm 13 subtending outwardly from one leg 14. Welded to the underside of arm 13 and the lower section of leg 14 are two narrow metalic L-shaped plates 15 and 16 placed to have a gap between them to receive the threaded rod 17, which receives nuts 18, washers 19, and rubber tip 20. The arm subtending from the leg 14, is drilled in four places. One hole 21 is on the centerline to receive hold down bolt 22, wing nut 23, and washers 24 for holding adjustable clip 25. The remaining three holes 26 are drilled, through the subtending arm 13 and the leg oftheL-shaped support 16, off center, and equally spaced apart to selectively receive an upright support 42. The base of the U-shape structure 12 is drilled to receive a vertically positioned wheel receiving adjustable bolt 27, and two lock nuts 28. Holes are drilled at the upper extremities of each leg to receive bolts 29, wing nuts 30 and washers 31 which retain folding loop wheel supports 32 and 33. A metallic stop 34, is securely fastened to theouter face of forward leg and positioned just below the drilled hole to act as a horizontal stop for the wheel supports 32 and 33.

LOOP WHEEL SUPPORT

Loop wheel supports 32 and 33 are fabricated from metallic sheet metal. After the length is determined slotted holes 67, 68 are made in both ends and the support formed into a U-shape. To nestle one inside the other for compact storage, one loop 32 is made slightly smaller than the other loop 33 and they are then paired together.

CLIP — BUMPER

The metallic clip 25 has one end 35 rolled under to form a clip. A minimum of two holes 39 are drilled on the centerline and used for adjustment during the mounting of the wheel support on a bumper.

UPRIGHT SUPPORT

The upright support 42 has on its upper end a ring 36 securely fastened to it and has its lower end drilled to accept a cotter pin 37. At a predetermined point above the lower end a collar 38 is securely fastened, which on assembly abuts the subtending arm 13 and so remains after the installation of cotter pin 37.

ASSEMBLY OF INDIVIDUAL WHEEL SUPPORTS

Figure 3:
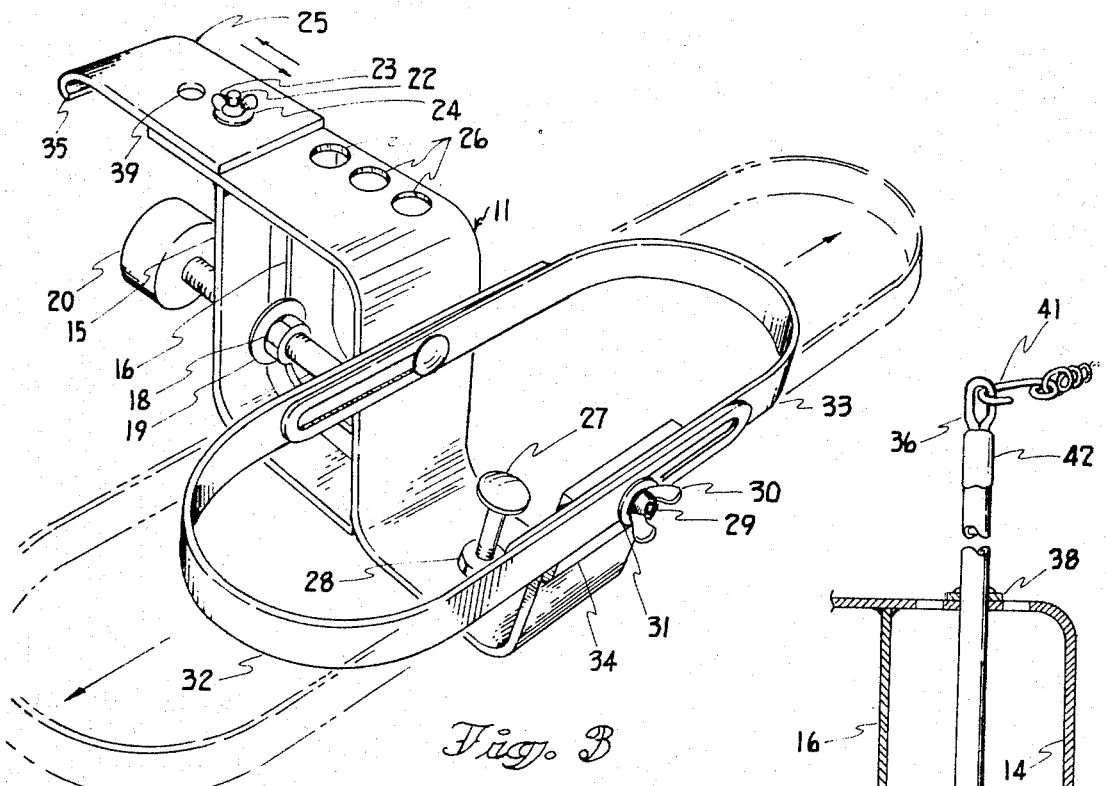
FIG. 3, shows in perspective, a view of the wheel support indicating with dotted lines and directional arrows how adjustments of its components are undertaken.
Figure 5:
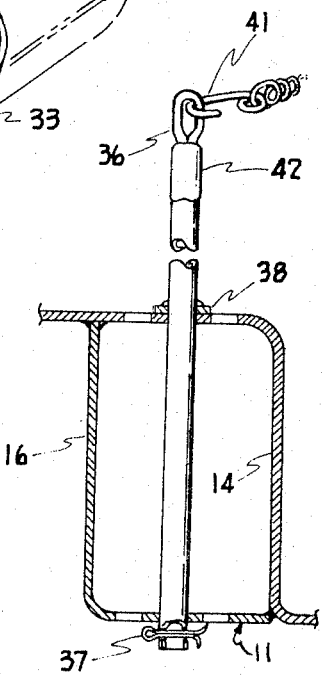
FIG. 5 is a partial cross section of a wheel support showing mounting and etention of the upright support.
Figure 4:
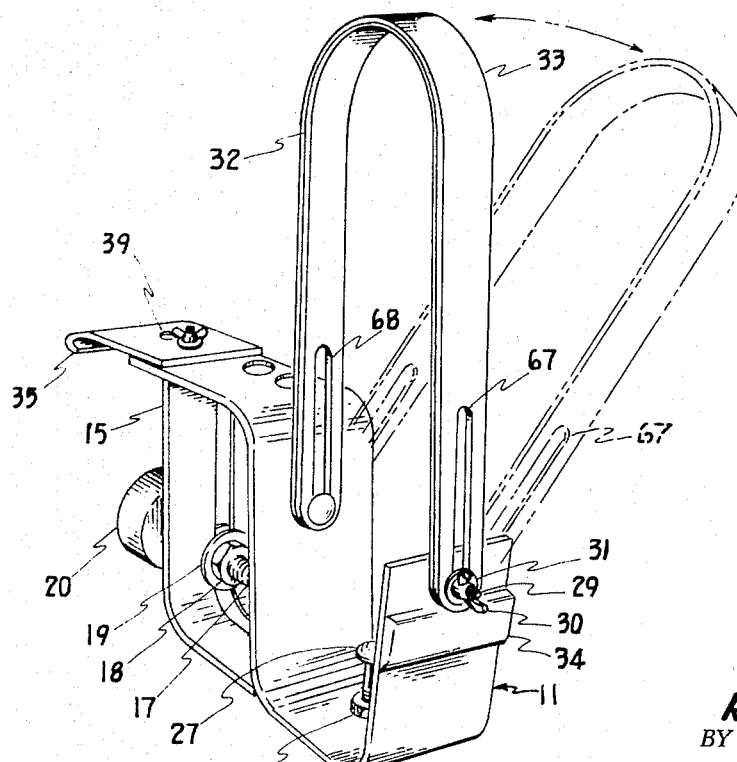
FIG. 4, shows in perspective, a view of the wheel support indicating with dotted lines and directional arrows how the loop wheel supports are positioned for compact storage.
Figure 6:
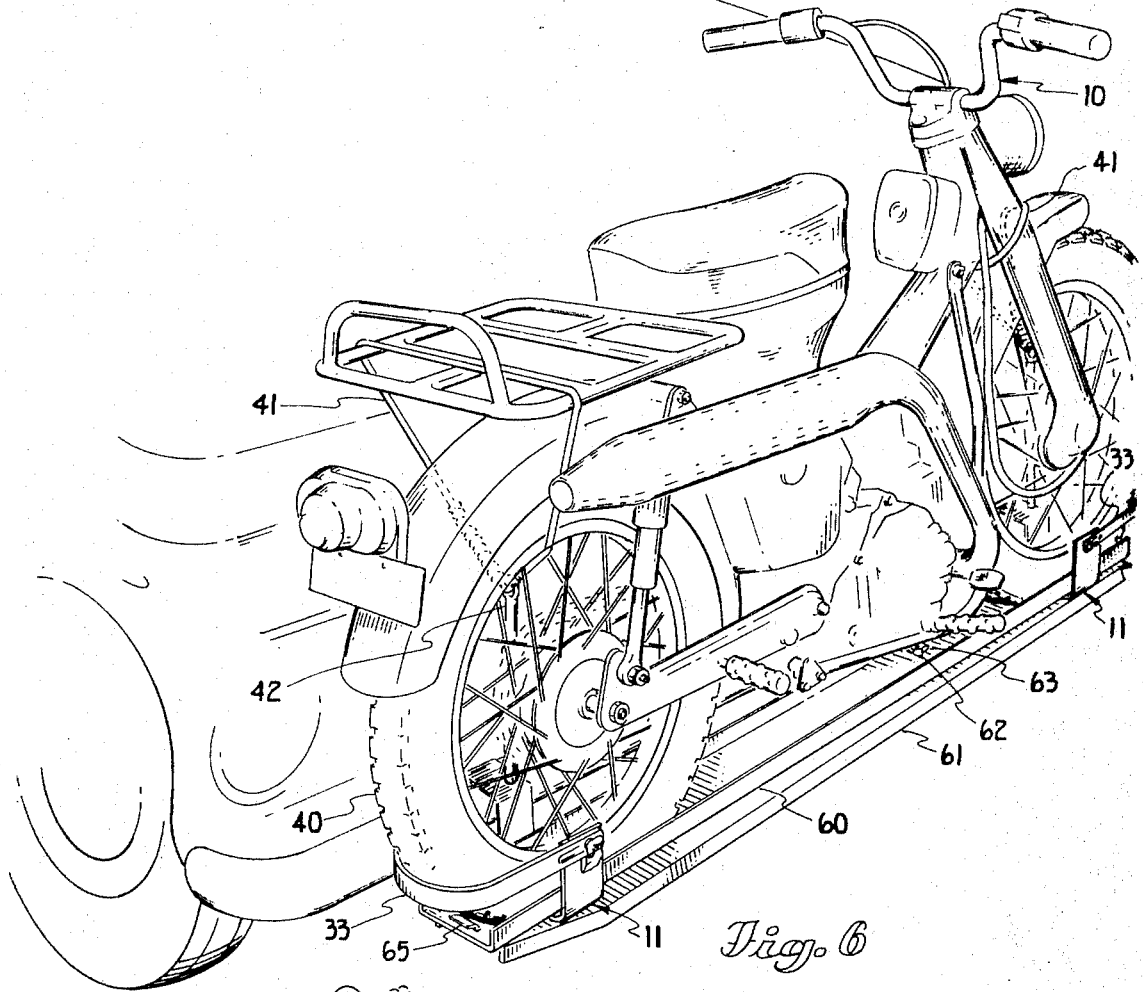
FIG. 6, shows in partial perspective, a two wheeled vehicle supported by individual wheel supports having upright supports receiving tie downs, and also showing how the cross track and loading and unloading ramp are secured, as the cross track is placed across the wheel supports and the ramp is secured below the cross track.
Figure 7:
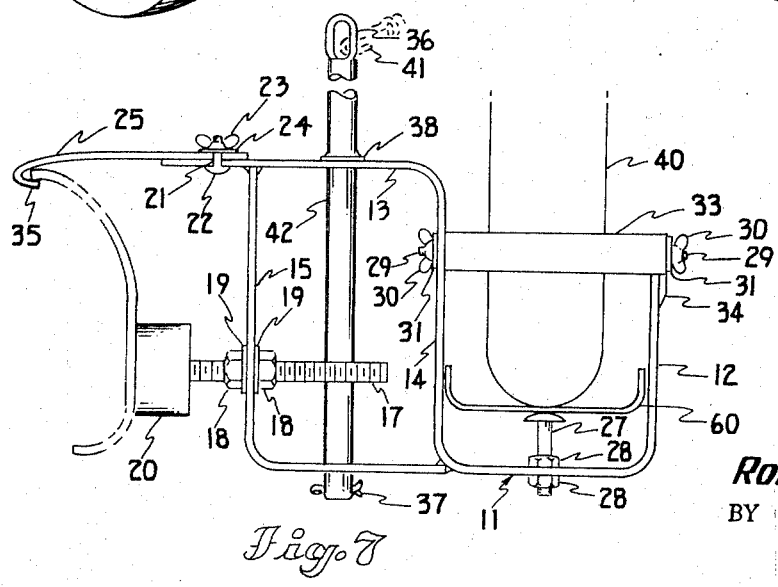
FIG. 7, is a partial cross section indicating how the individual wheel support with its upright support or post and the cross track, is mounted to a bumper of a four wheeled vehicle.
Figure 8:
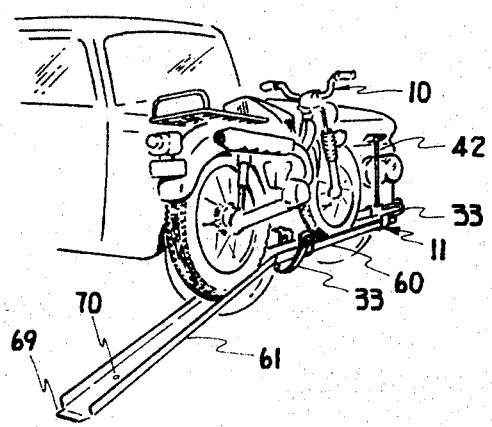
FIG. 8, shows in partial perspective, a two wheeled vehicle commencing its descrnt down the inclined ramp.
Figure 9:
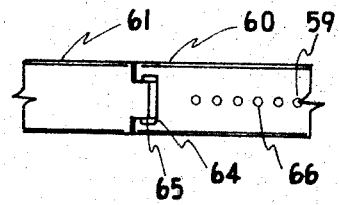
FIG. 9, is a top view of the cross track and loading and unloading ramp interconnected.
Figure 10:
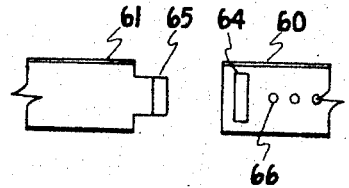
FIG. 10, is a top view of the loading and unloading ramp disconnected from the cross track.
Figure 11:
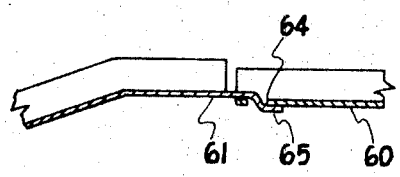
FIG. 11, is a side view of the cross track and loading and unloading ramp interconnected.
Figure 12:
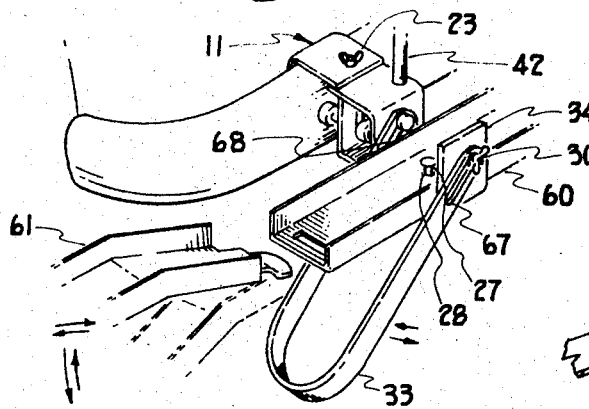
FIG. 12, shows a partial view with arrows and dotted lines depicting the positioning of the wheel loop, and the motions required to connect the loading and unloading ramp to the cross track.

With all components assembled as shown in FIGS. 3 and 5, the wheel supports are hooked onto the bumper of the four wheeled vehicles, with distance between the centerline of each carrier corresponding to the centerline distance of the wheels of the two wheeled vehicle being carried. The wheel supports are positioned to gain virtual parallelism between the bottom of the U-shaped structure and ground by adjusting bolt 17 in or out and up or down. If there is insufficient latitude by this means remove the wheel support in its entirety and select another hole 39 in the clip-bumper 25 and reinstall. Place upright support 42 in one of three holes provided and secure tentatively in position with cotter pin 37. Trial and error will establish the best position. After the securement of each individual wheel support, on the bumper of the carrying vehicle, has been made, the loop wheel supports 32 and 33 are folded open as shown in FIG. 3 by pulling them out horizontally to their fullest extent. Then the wheels of the two wheeled vehicle are lowered into the wheel supports. The vertical wheel adjusting bolt 27 are raised up or lowered down, as required, to insure adequate clearance of any overhanging object on the two wheeled machine's lower extremeties socket as the chain and/or sprocket. Then the loop wheel supports 32 and 33 are moved together until they snugly fit tires 40. The wing nuts 30 are then tightened. Tie downs 41 are installed using upright supports 42, to retain the correct retaining force on the two wheeled vehicle to prevent its undue movement until the four wheeled vehicle is underway.

ASSEMBLY OF CROSS TRACK SUPPORT

Individual wheel supports used with cross tracks 60 have one less loop wheel support or wing 32 to accommodate the loading and unloading of the two wheeled vehicle 10 using cross track 60 and ramp 61.

CROSS TRACK

A channel sectioned cross track or cross ramp 60 fits snugly within the confines of the U-shaped structure 12 of the wheel support 11. Two holes 59 are drilled in the base of the cross track 60 to receive carrying bolts 62 and nuts 63 used in securing the loading and unloading ramp 61. Slots 64 are machined at the extremities of cross track 60 to receive the connecting tongue 65 of the loading andunloading ramp, 61. Two slots 64 are made, if unloading in either direction is wanted, or only one slot 64 is provided if unloading is to occur only at one end. Also an additional group of holes 66, approximately ten in number, are provided on each side of the cross track 60 to match wheel base requirements by selectively positioning the adjustable height bolts 27, secured by lock nuts 28, directly below the wheel centers of a two wheel vehicle 10.

LOADING AND UNLOADING RAMP

The loading and unloading ramp 61 made of channel material has one end machined to form a tongue 65 to fit into slot 64 of cross track 60. Its opposite end has the channel side walls removed and the web portion bent to form a surface support pad 69 to prevent sinking in soft earth or sand. Or the pad 69 may be bent oppositely to grip a harder surface. Two holes are drilled into the web of the channel of ramp 61 to match those drilled into the cross track to be used when it is secured during highway travel.

ASSEMBLY OF WHEEL SUPPORTS WITH CROSS TRACKS

The wheel supports 11 adapted to receive the cross track 60 are mounted to the four wheeled carrying vehicle's bumper and adjusted into position in the identical way as are the individual wheel support assemblies 11. However, before the wheel height adjusting bolts 27 are secured, the cross track 60 is laid on the wheel supports 11, leaving an approximately equal overhang at each end. Also, selected holes at each end in the group of holes 66 are aligned with the holes in the wheel supports 11. Then wheel height adjustable bolts 27 are installed to also rigidly secure the cross track 60 to thewheel supports 11. One loop wheel support or wing 33, is folded down until it is butted against the stop 34 and it is then fully extended. The other loop wheel support 32 is pivoted downwardly below the level of cross track 60 after loosening wing nut 30 and springing loop support 33 to clear any hindering portions of stop 34. Loading and unloading ramp 61 is attached by placing tongue 65 in slot 64 on cross track 60. The two wheeled vehicle 10 is pushed up the ramp until wheel centers are in line with centers of the individual wheel supports 11. The loading and unloading ramp 61 is removed and the loop wheel support 33 is pivoted upwardly until it is in the same plane as the loop support 33 on the other wheel support 11. Both loop wheel supports 33 are adjusted until they are snug with tires 40 and then wing nuts 30 are tightened.

The loading and unloading ramp 61 is thereafter secured for travel on the four wheel vehicle, as the ramp 61 is inverted and its tongue 65 is placed into slot 64 of cross track 60. The remaining free end of the inverted loading and unloading ramp 61 is then raised up adjacent to cross track 60 and secured to it by using bolt 62 and nut 63 passed through holes 70 in the ramp 61 and holes 59 in the cross track 60. The tie downs 41 are passed about or hooked to the two wheel vehicle and to the upright supports 42 and the overall assembly is ready for highway travel.

SUMMARY OF ADVANTAGES

Any two wheeled vehicle can be carried easily and safely using these individual wheel supports mounted to the front or rear bumpers of a four wheeled vehicle. Essentially one manufactured size of a carrier is adjustable to fit any diameter tire and wheel of a two wheeled vehicle, by means of adjustable hoop supports which form an elliptical well to surround the tire and hold it in place and by adjusting the height of a tire rest. These adjustable loop supports or bands may be swung upright into a very compact non use position for shipment and storage.

In handling extremely heavy two wheeled vehicles and also to reduce the burden of lifting, in handling lighter two wheeled vehicles in and out of the individual wheel supports, a cross track and loading ramp are utilized. The cross track is placed between the uprights of the U-shape wheel support and rest on the vertical wheel height adjusting bolts. The loading ramp is carried securely attached to the underside of the cross track when the four wheeled vehicle is underway. At the destination, it is hooked to one side of the cross track during unloading and/or loading of the two wheeled vehicles. All the bumper mounted wheel supports use many common parts and no major changes are required when using the cross track and ramp with them.

I claim:

1. An individual wheel support to receive a wheel of a two wheel vehicle to be mounted on a four wheel vehicle bumper, two of which will support the two wheeled vehicle, each one being easily mounted and readily adapted to whatever size wheel and tire are on the two wheel vehicle, comprising:
   a. an adjustable metal bracket which forms a tire well and hangs from a bumper;
   b. adjustable metal loop wheel well supports secured to the adjustable metal bracket which adapts to the fore and aft width of a two wheeled vehicle tire;
   c. a supporting right angle brace secured to the adjustable metal bracket;
   d. a horizontally positioned threaded adjustably padded bolt to pass through the right angle brace to contact a bumper of the four wheel vehicle;
   e. a partially threaded bolt passing through the bottom of the adjustable metal bracket to raise or lower the depth of penetration of the tire into the tire well.

2. An individual wheel support, as claimed in claim 1, wherein the adjustable metal bracket forming the tire well and the supporting right-angled brace secured to the adjustable metal bracket are modified to receive means of securing the two wheeled vehicle, comprising;
   a. an upright support post with a tie down receiving ring at the upper extremity of the post, a supporting collar below the center of the post which abuts the adjustable metal bracket when installed, and a quickly detachable fastener at the lower extremity of the post; and
   b. a tiedown that after being looped around the two wheeled vehicle has both ends securely attached to the upright support post receiving ring.

* * * * *